United States Patent Office 3,266,040
Patented August 9, 1966

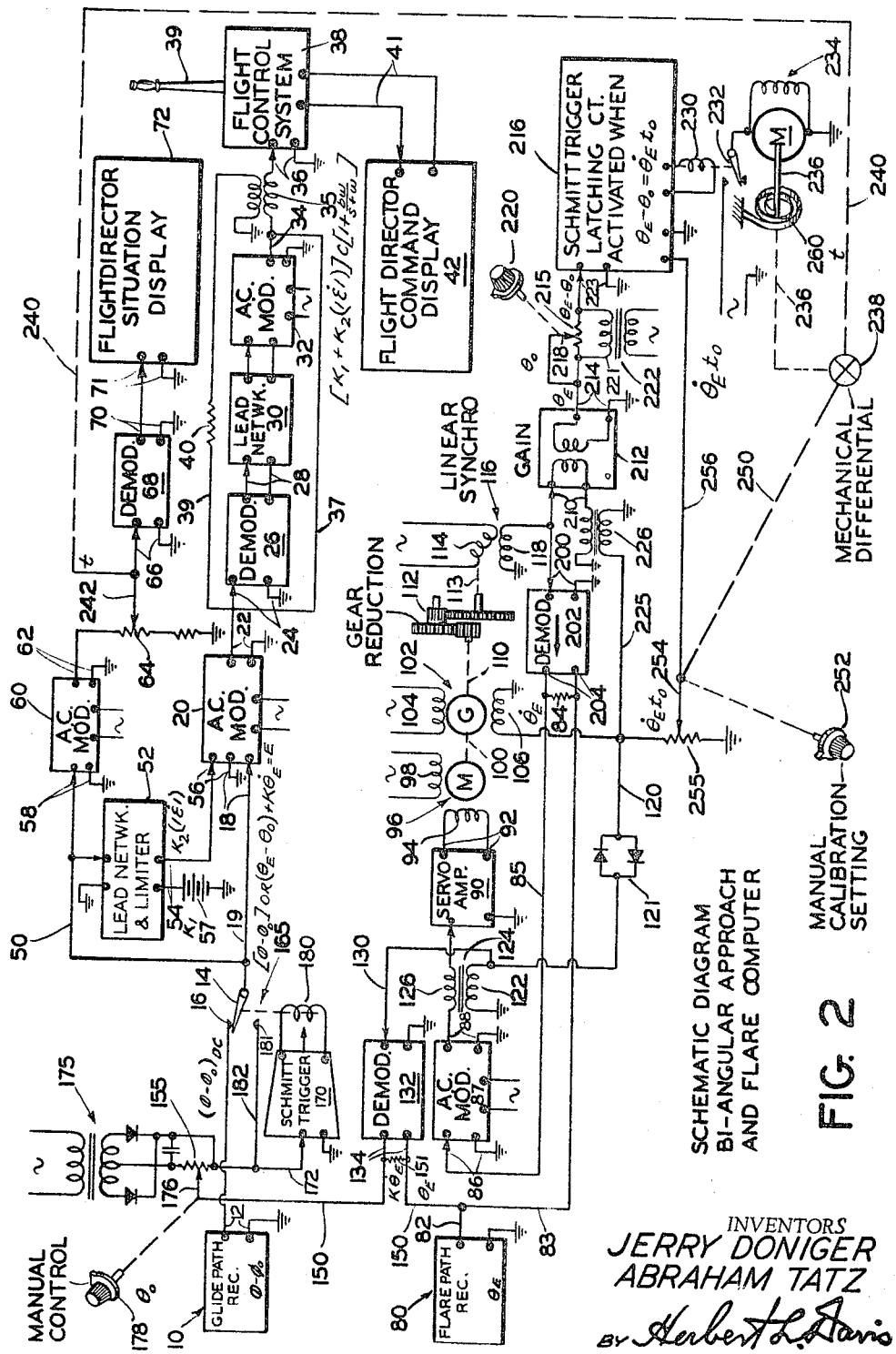

3,266,040
FLIGHT CONTROL SYSTEM RESPONSIVE TO APPROACH AND FLARE-OUT BI-ANGULAR ELEVATION TRANSMISSIONS
Jerry Doniger, Montvale, N.J., and Abraham Tatz, Levittown, N.Y.; said Doniger assignor to The Bendix Corporation, a corporation of Delaware; said Tatz assignor to Cutler-Hammer, Inc., Milwaukee, Wis., a corporation of Delaware
Filed Apr. 22, 1963, Ser. No. 274,476
8 Claims. (Cl. 343—108)

This invention relates to improvements in a flight control system responsive to approach and flare-out bi-angular elevation transmissions of a type such as described in French Patent No. 1,260,282 based on a U.S. application for Patent Serial No. 825,469, filed July 7, 1959, by Abraham Tatz and Frederick Hugh Battle, Jr., and now abandoned, the subject matter of which is included in a continuation-in-part application Serial Number 123,928, now Patent Number 3,157,877, filed June 28, 1961, and more particularly to such a system including airborne receivers operative in conjunction with a dual elevation data transmission system located near an aircraft landing runway to provide control signals to appropriate automatic pilot and/or cockpit display systems in an aircraft.

An object of the invention is to provide a control system of a flight vehicle under control of two land based data transmission data devices in which the control system includes a first device for receiving glide path signals from one of said data transmission devices, a second device for receiving flare path signals from the other of said data transmission devices, relay means operable by the flare path signal receiving device for transferring control of the system from the glide path signal receiving device to the flare path signal receiving device, a differentiating circuit means for effecting an output signal in response to a rate of change in the output signal provided by the flare path signal receiving device together with additional means for applying said rate signal to the output signal from the flare path signal receiving device so as to render the relay means effective upon the rate of change in the signal provided by the flare path signal receiving device being at a predetermined value relative to the output signal provided by the flare path signal receiving device.

Another object of the invention is to provide in the aforenoted control system a differentiating circuit means including a servomotor means operable by an output signal from the flare path signal receiving device, a rate generator driven by the servomotor means for effecting an output signal in response to rate of change in the output signal provided by the flare path signal receiving device, and additional means for applying said rate signal to the output signal from the flare path signal receiving device so as to render the relay means effective upon the rate of change in the signal provided by the flare path signal receiving device having a predetermined value relative to the output signal being provided by the flare path signal receiving device.

Another object of the invention is to provide in the aforesaid control system novel means for effecting a signal $K\theta_E$ where $\theta_E$ is derived as angular rate of change of the signal $\theta_E$ provided by an elevation angle follow up servo means and in which the signal $\theta_E$ is provided at the output of the flare path receiver and the design value of $K$ is chosen on the basis where the flare must be initiated in order to meet the touchdown conditions of the aircraft; and in which arrangement the signal $K\theta_E$ is added to the signal $\theta_E$ provided at the output of the flare path receiver so that the resultant signal may be applied to a suitable relay means for effecting a transfer of the control of the aircraft from the glide path receiver to the flare path receiver upon the signal $\theta_E + K\theta_E$ equaling in the value a third signal $\theta_0$ arranged to set the level at which the relay means is to be rendered operative for the aforenoted selector control.

Another object of the invention is to provide novel means for switching outputs of an instrument landing system glide path signal $(\phi - \phi_0)$ to the function $$(\theta_E - \theta_0) + K\theta_E$$

which includes means automatically operated at the instant when $\theta_E + K\theta_E$ equals a selected signal $\theta_0$ set by a manual operator-operative control knob.

Another object of the invention is to provide novel control means to effectively shift the landing operation of an aircraft from a glide path control signal to a flare path control signal in response to the rate of change in the signal provided by the flare path signal receiving device and upon the rate of change in such signal being at a predetermined value relative to the output signal provided by the flare path signal receiving device.

Another object of the invention is to provide a novel control system for an aircraft including means for controlling the aircraft both in its approach to the landing field and the flare to touchdown through signal paths effected by two elevation angle data transmitters cooperating with suitable receivers carried by the aircraft and so arranged that switch over from an approach signal path to a flare signal path may be automatically selectively effected upon the rate of change in the signal provided by the flare path being at a predetermined value relative to the signal provided by the flare path signal receiving device.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 2 is a schematic diagram of a bi-angular approach and flare computer system embodying the present invention.

Figure 1:
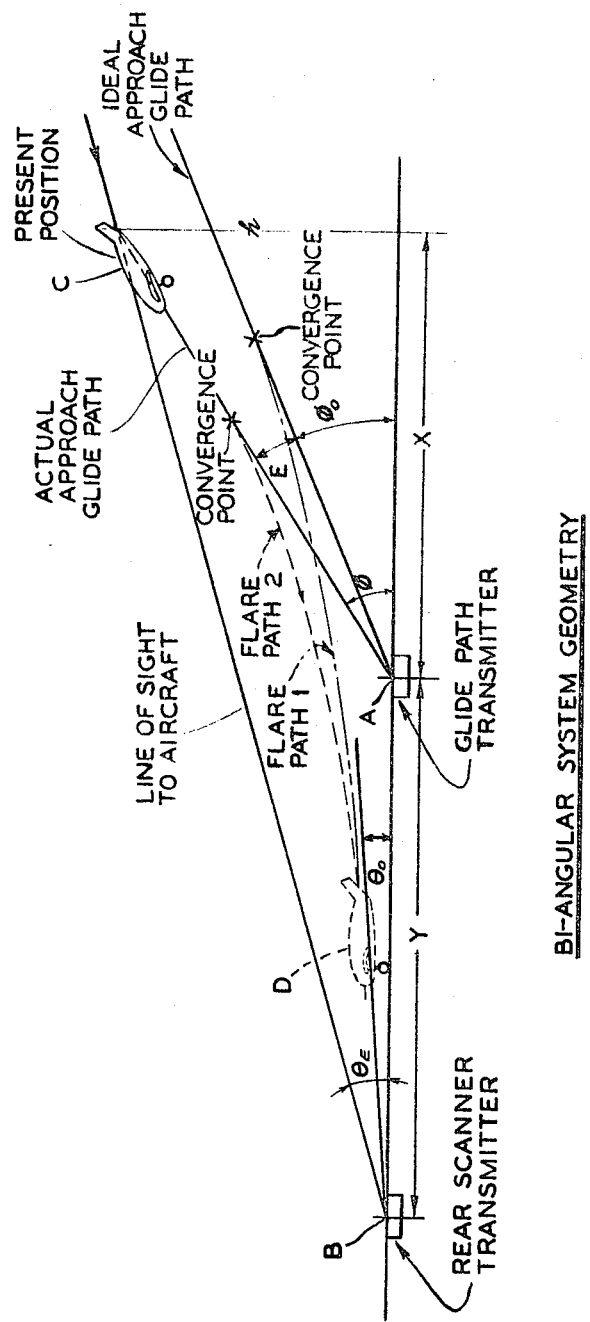
FIGURE 1 is a diagrammatic view illustrating a bi-angular signal transmitter system for controlling operation of the bi-angular approach and flare computer system.

Referring to the drawing of FIGURE 1, a system is shown in which signals are generated by elevation angle data transmitters, indicated by the letters A and B of FIGURE 1 and located near the landing runway. The geometrical relationship of the landing aircraft and the two transmitters A and B is illustrated schematically in FIGURE 1.

In the drawing of FIGURE 1, the forward scanner or glide path transmitter A may function as a normal instrument landing system fixed glide path transmitter with a known elevation angle $(\phi_0)$. The rear scanner transmitter B is a device which moves a flat azimuth radio beam in an oscillating manner in the vertical plane. The aircraft indicated in the drawing of FIGURE 1 by the letter C is repeatedly illuminated by this beam and the instantaneous elevation angle $(\theta_E)$ information which is encoded on the beam may be extracted by an airborne receiver carried by the aircraft C. It will be seen from FIGURE 1 then that inasmuch as the distance between the transmitters A and B is known, all the position information of the aircraft C with respect to the ground may be readily determined.

Heretofore, glide path approach receivers have been arranged to operate on the beam deviation signal so as to form rate and integral term signals. In such receivers, the deviation signal and the rate and integral signals formed therefrom have been summed to provide a pitch command signal. However, in such arrangement the control means therein provided have been found to be susceptible to beam noise due to the dependence in such controls on the rate term signal for stability.

The approach capability of an arrangement controlled by such receivers has been found to be limited to a great extent by this noise on the glide slope transmission and such low approach capability has been found necessary before any flare processes may be initiated. However, if the displacement gain of the receiver were to be made a function of beam rate, such that lower gains are imposed on the system when beam rates were encountered, then the effects of noise may be minimized thereby. The control system of the receiver represented herein and shown schematically in FIGURE 2 provides for such gain modulation by beam rate, as will be explained hereinafter.

In this embodiment, a control system is so arranged that the transmitter signal data may be used directly to generate an exponential angular flare path. Such a flare path was chosen for its ease of implementation and the further fact that constant elevation angle near touchdown may be utilized to establish mean values for both rate of descent and longitudinal position at touchdown, as shown diagrammatically in FIGURE 1.

The exponential flare path may be used to program rate of descent as a function of angle. The parameters which are chosen as a function of the approach rate of descent and which provide a safe touchdown rate of descent and longitudinal position are asymptotic angle, the path curvature and the initial engagement angle. Thus by the generation of an angular exponential flare path, the aircraft C is commanded to fly from one value of rear site elevation angle to a preselected elevation angle by the following control equation:

$$(\theta_E - \theta_o) + K\dot{\theta}_E = \text{path deviation}$$

where $\theta_E$ = elevation angle between line of sight to aircraft and the rear scanner transmitter, and the runway surface.

$\theta_o$ = desired elevation angle at touchdown.

$\dot{\theta}_E$ = rate of change of measured rear scanner elevation angle.

$K$ = gain which determines the flare path curvature.

It is only necessary to ensure that the flare path is monotonic and that the curvature is such that the aircraft C, as shown in FIGURE 1, has acquired the final elevation angle prior to touchdown so that the aircraft is in unaccelerated terminal flight, as indicated in dotted lines and shown by the letter D of FIGURE 1.

Under these conditions trim changes due to ground proximity may be handled efficiently by the flight control system or automatic pilot. The longitudinal touchdown region is determined by the height of the airborne receiver antenna above the wheels of the aircraft and the desired value of final rear site of the angular flare computation changes due to the summation of angular displacement above the desired final elevation angle $(\theta_E - \theta_o)$ and the rate of change of the elevation angle $(K\dot{\theta}_E)$. The control system is so arranged as to first command a nose down pitch change which is reduced to zero as the aircraft continues the approach descent prior to flare initiation. If the descent were to continue below 100 feet, the command would call for increasing nose up attitude. The control system is so arranged that the flare path is initiated only when the command is at a null. This minimizes engage transients since the approach coupler portion of the flare computer operates to maintain a null deviation in that flight region. The absolute magnitude of the rate of change of the path deviation is used in this mode of operation to minimize the effects of elevation angle convergence and track signal noise.

*Glide path signal*

During the initial phase of the approach of the aircraft, the control system uses a glide path deviation signal for vertical guidance as effected by the glide path transmitter A while a signal proportional to the absolute magnitude of the glide path beam rate signal is used to modulate the displacement gain. Under noisy beam conditions, the displacement gain is automatically adjusted below the mean, or no noise, value. This technique of noise desensitization improves the low approach capability of the system and provides for more reliable flare engagements. It also provides a significant degree of independence from the gain change due to beam convergence. The track error signal which is displayed on the course deviation indicator of the flight director is adjusted as a function of the time-to-touchdown to provide a course softening for manual flight control operation of the aircraft. A rate modified displacement signal is applied so as to improve the tracking accuracy of the system.

Referring now to the schematic diagram of FIGURE 2 in effecting the foregoing mode of operation, there is provided a glide path signal receiver 10 of a known type for receiving signals from the glide path transmitter A of FIGURE 1 and arranged to provide a direct current output signal across the lines 12 indicative of the error in the position of the aircraft C or glide slope deviation. This is the standard ideal approach glide path set by the signals from the glide path transmitter A and represented by the difference between the angle $\phi$ between the actual approach path of the aircraft and ground and the angle $\phi_o$ between the ideal approach glide path and the ground. Thus the D.C. signal applied across lines 12 is dependent upon the difference between the prevailing position of the aircraft and the ideal approach glide path.

The glide path deviation D.C. signal applied across output 12 is in turn applied through a relay switch arm 14 which is initially biased to a position to close a contact 16 and through conductor 19 and the grounded output connection 12 across the input lines 18 of an A.C. modulator 20 of conventional type and energized from a suitable source of alternating current.

The output of the modulator 20 is in turn connected through lines 22 to an input 24 of a demodulator 26 of conventional type having output lines 28 connected through a conventional lead network 30 and through a second A.C. modulator 32 of conventional type and energized from the suitable source of alternating current. Output leads 34 lead from the modulator 32 to input 36 of a conventional flight control system 38 having a manually operable control 39 which may be of a conventional type or of a type such as disclosed and claimed in U.S. Patent No. 3,057,585, granted October 9, 1962 to John C. Ziegler, Lucien R. Beauregard and Harry Langer, assigned to The Bendix Corporation and arranged to selectively render the flight control system 38 operative to control the aircraft or in the alternative the control 39 may be operative to effect manual control of the aircraft.

A follow up signal is applied through a conductor 37 from the output 34 of the A.C. modulator 32 to the input of the demodulator 26 in a conventional manner. Further a rate modified displacement signal is applied from the output 34 of the A.C. modulator 32 through coupling transformer 35 and resistor 40 to the input of the demodulator 26 so as to improve the tracking accuracy of the system.

The flight control system 38 has output lines 41 connected to a flight director command display 42 of conventional type for displaying to the operator of the aircraft the condition of the flight control system 38 in conventional manner.

The signal applied across output lines 41 leading to the flight director command display, as indicated by the formula $$[K_1 + K_2(|\dot{\epsilon}|)]C\left[1 + \frac{b\omega}{S+\omega}\right]$$

includes a signal $[K_1 + K_2(|\dot{\epsilon}|)]$ applied at input 24 from the A.C. modulator 20 and the lead network and limiter 52, while the remainder of the formula $$C\left[1+\frac{b\omega}{S+\omega}\right]$$

represents the transfer function of the lead network 30 as altered by the feedback circuit 37.

Also leading from the input line 19 is a conductor 50 which leads to the input of the conventional lead network and limiter 52 having output conductors 54 through which is applied a signal $K_2(|\epsilon|)$ to input lines 56 for controlling the gain of the A.C. modulator 20.

In the aforenoted arrangement, there is further provided a source of electrical energy such as a battery 57 which applies a biasing voltage $K_1$ to the signal $K_2(|\epsilon|)$ so that a total signal $K_1+K_2(|\epsilon|)$ is applied across the input lines 56 to the A.C. modulator 20 to ensure a minimum gain in the error signal applied therethrough while the limiter portion of the lead network 52 prevents the gain signal applied therethrough from exceeding a predetermined maximum value. The noise desensitization means provided by the lead network and limiter 52 is described in greater detail and claimed in a U.S. application for Patent Serial No. 491,148, filed September 29, 1965, by William W. Medlinski, and assigned to The Bendix Corporation.

The conductor 50 also leads to the input 58 of modulator 60 of conventional type and energized from the suitable source of alternating current. The modulator 60 has an output 62 applied through an adjustable gain control potentiometer 64 to the input 66 of a demodulator 68 having output lines 70 leading to the input 71 of a flight director situation display 72 of conventional type for indicating to the operator of the plane the flight condition of the aircraft.

The potentiometer 64 is adjusted, as hereinafter explained, so as to vary the gain in the input signal applied to the demodulator 68 to effect a constant gain in the error signal applied across the output lines 70 of the demodulator 68 and to the input lines 71 of the flight director situation display 72 as the actual approach path of the aircraft C tends to converge with the glide path and in turn with the predetermined flare path as a function of the time required for the aircraft to go to the touchdown or landing position.

Thus, the observer of the flight director situation display 72, so long as the angle of the deviation error does not change, sees a constant error display due to the constant gain in the error signal as the actual approach path of the aircraft C tends to converge with the flare path in approaching the touchdown position D.

*Flare phase of the approach*

During the second or flare path phase of the aircraft approach to the touchdown position D, a signal which is transmitted from the rear scanner transmitter "B" is received by a receiver 80 of a suitable type shown diagrammatically in FIGURE 2 and arranged to provide a direct current output signal across the lines 82 which is the function of $\theta_E$ where $\theta_E$ is the elevation angle of the line of sight to the aircraft in flight as measured by the rear scanner transmitter "B" of FIGURE 1.

This D.C. output signal $\theta_E$ is then applied through a conductor 83, resistor 84, conductor 85 to the input 86 of an A.C. modulator 87 of conventional type and energized from the suitable source of alternating current. The modulator 87 has output lines 88 connected to the input of a suitable servo amplifier 90 of conventional type. The output of the amplifier 90 is applied across output lines 92 leading to a control winding 94 of a conventional two phase motor 86 having a fixed phase winding 98 energized from the suitable source of alternating current.

The two phase motor 96 in turn drives through a shaft 100, a rate generator 102 having a fixed phase input winding 104 connected across the suitable source of alternating current, and an output control winding 106. The rate generator 102 and motor 96 are in turn connected through a shaft 110, gearing 112, and a shaft 113 to an adjustably positioned control winding 114 of a linear synchro 116. The adjustable winding 114 is connected across the suitable source of alternating current and is inductively coupled to an output winding 118 of the synchro 116.

The rate generator 102 applies an A.C. signal through the output winding 106 which is proportional to the angular rate of change of the elevation angle $\theta_E$ of the aircraft in flight. The output signal applied through the winding 106 of the rate generator 102 is applied through a conductor 120 and suitable rate signal limiting diode means 121 to a primary winding 122 of a coupling transformer 124 which is in turn inductively coupled to the secondary winding 126 of the coupling transformer 124 and connected in an output line leading from the A.C. modulator 86 to the input of the servo amplifier 90. The rate generator 102 applies through the coupling transformer 124 an antihunting signal to the input of amplifier 90 in a conventional manner.

The diode means 121 serves to limit the effective rate signal so as to prevent decrease in the slewing speed of the servomotor 96 under high signal operating conditions.

The line 120 is further connected through a line 130 to an input of a demodulator 132 of conventional type having output lines 134 connected in the line 150 leading from one of the output lines 82 of the receiver 80 through a resistor 151.

There is thus applied to the output line 150 a signal $K\theta_E$ where $\theta_E$ is derived as angular rate of change of the signal $\theta_E$ in the elevation angle follow up servo by means of the rate generator 102. A design value of K is chosen on the basis of where the flare must be initiated in order to meet the touchdown conditions.

The signal $K\theta_E$ is then added to the signal $\theta_E$ applied to the line 150 by the output line 82 so that the signal thus applied through the line 150 to the potentiometer 155 would be indicated as a function of $\theta_E+K\theta_E$ where $\theta_E$ is the elevation angle of the line of sight of the aircraft in flight as measured from the rear scanner transmitter "B" and $\theta_E$ is derived approximately in the the elevation angle follow up servo by means of the rate generator 102, as heretofore explained.

Switching of the outputs from the instrument landing system glide path signal $(\phi-\phi_0)$ to the function $\theta_E+K\theta_E$ is accomplished automatically by a latching relay 165 operated by a solid switching or a Schmitt trigger latching circuit 170 connected by an input conductor 172 to one end of the potentiometer 155.

The potentiometer 155 is connected across a suitable source of D.C. current 175 and has an adjustable arm 176 which may be operated by a suitable operator-operative manual control 178 to set the value of a signal $\theta_0$ or level at which the relay 165 is energized by the Schmitt trigger 170.

Thus connected across the output of the Schmitt trigger 170 is winding 180 of the relay 165 arranged to adjustably position the selective relay switch arm 14 so that when the signal $\theta_E+K\theta_E$ equals the signal $\theta_0$, the output from the instrument landing system glide path signal $(\phi-\phi_0)$ is disconnected from the line 19 as the switch 14 is biased by the relay winding 180 so as to close a contact 181 and connect the line 172 through the conductor 182 and switch arm 14 to the line 19.

Thus switching of the outputs of the instrument landing system glide path signal $(\phi-\phi_0)$ to the function $(\theta-\theta_0)+K\theta_E$ is accomplished automatically by the latching relay winding 180 operated by the Schmitt trigger 170 or solid state switching circuit at the instant when $\theta_E+K\theta_E$ equals the selected signal $\theta_0$ set by the manual operator-operative control knob 178.

The design value of K is chosen on the basis of where the flare must be initiated in order to meet the desired touchdown conditions. Thereafter, the flight control system 38 and flight director situation display 72 and flight director command display 42 is controlled by the signal $(\theta_E-\theta_0)+K\theta_E$ as derived from the rear scanner transmitter "B" rather than by the instrument glide path signal $(\phi-\phi_0)$ as derived from the transmitter "A" of FIGURE 1.

The output winding 118 of the linear synchro 116 is connected through conductors 200 to the input of demodulator 202 which in turn has its output 204 connected across resistor 84 and into conductors 83 and 85 leading to the input of the A.C. modulator 87 so as to apply therethrough a follow-up signal proportional to the angular position of the shaft 113 driven by the servomotor 96.

*Adjustable gain control means*

There is further disclosed herein an adjustable gain control means for the control signal of the flight director situation display 72, and which control means does not form the subject matter of the present invention, but rather this feature is described in greater detail and claimed in a U.S. application for patent, Serial No. 248,329, filed December 31, 1962, by Frederick B. Sylvander, and assigned to The Bendix Corporation. In effecting operation of the adjustable gain control means, the output winding 118 of the linear synchro 116 is further connected across input lines 210 of a suitable gain circuit 212 having output lines 214 connected to the input of a Schmitt trigger latching circuit 216. The output lines 214 include a potentiometer 215 having an adjustable arm 218 operatively positioned by an operator-operative knob 220 and across the potentiometer 215 is connected to a secondary winding 221 of a signal biasing transformer 222 having a primary winding connected across the suitable source of alternating current.

There is applied across the potentiometer 215 through the transformer 222 a suitable A.C. biasing voltage designated $\theta_0$, which biasing voltage is applied in opposition to an A.C. signal voltage designated $\theta_E$ applied through the gain circuit 212 by the synchro 116 proportional to the position of the shaft 110 driven by the servomotor 96 as controlled by an output signal from receiver 80 applied through the A.C. modulator 86. The A.C. signal designated $\theta_E-\theta_0$ is applied to the Schmitt trigger latching circuit 216 through input conductors 223.

The A.C. signal obtainable from the winding 118 of the linear follow up synchro 116 will differ from the actual input signal of $\theta_E$ controlling the servomotor 96 by a slight velocity lag. However, this error may be corrected by adding a proper amount of rate signal from the rate generator 102 through a conductor 225 and coupling transformer 226 to the output of the linear synchro 116 applied to the gain circuit 212.

The Schmitt trigger latching circuit 216 is brought into operation at the point where a signal $\theta_E-\theta_0$ equals a signal designated $\theta_E t_0$ and derived as hereinafter explained. At this point the Schmitt trigger latching circuit 216 is effective to energize a relay winding 230 which in turn acts to bias the relay switch 232 to a closed position for effectively energizing a constant speed timing motor 234.

Prior to the energization of the constant speed motor 234, the shaft 236 is adjusted to an initial angular position under the bias force of a spring 260 which serves in effecting such angular adjustment to position through the mechanical differential 238, the shaft 240 and thereby the potentiometer arm 242 to a corresponding initial angular position. Further the differential mechanism 238 is adjustably set by a shaft 250 operated by manual calibration setting knob 252 which is arranged to simultaneously position an arm 254 of a potentiometer 255 connected across the output control winding 106 of the rate generator 102. The potentiometer arm 254 is adjusted so as to provide the designated signal $\theta_E t_0$ which is applied through a conductor 256 to the Schmitt trigger latching circuit 216, so as to control energization of the relay winding 230, as heretofore explained, upon the signal designated $\theta_E-\theta_0$ being equal to the signal designated $\theta_E t_0$.

The computed time-to-go to touchdown of the aircraft after the initiation of the flare path by the activation of the relay switch 165 is needed to effect a gain control function of the display deviation signals applied through the input conductors 71 to the flight director situation display 72. This gain control function is made available by the adjustment of potentiometer arm 242 driven by the constant speed motor 234 through the shaft 236, mechanical differential 238 and shaft 240.

In the aforenoted arrangement, the constant speed motor 234 is started when the predetermined time $t_0$ is reached as effected by the adjustment of the potentiometer arm 254 and the motor 234 starts to adjust the shaft 236 from an initial adjusted position effected through the adjustment of the mechanical differential 238 by the setting 252, and which position corresponds to the signal $\theta_E t_0$. This position of the mechanical differential 238 is preset by the same adjustment of the manual calibration setting 252 which sets the potentiometer arm 254 into the computation, and is essentially a fixed design parameter made adjustable for purposes of experiment.

There is further provided a spring 260 which acts on the shaft 236 of the constant speed motor 234 so as to turn the same and the shaft 240 to the initial position set by the adjustment of the mechanical differential 238 upon the control system being returned to the initial position.

The adjustable gain control means hereinbefore described forms the subject matter of the aforenoted U.S. application Serial No. 248,329 filed December 31, 1962, by Frederick B. Sylvander, and is not claimed herein.

*Operation*

During the initial phase of the approach of the aircraft, the control system shown in FIGURE 2 uses the glide path deviation signal E for vertical guidance as applied through the receiver 10.

During the second, or flare phase of the approach, the signal which is transmitted through the control system is the function $(\theta_E-\theta_0)+K\theta_E$, where $\theta_E$ is the elevation angle as measured from the rear scanner transmitter B and $\theta_E$ is derived, approximately, in the elevation angle follow-up servo by means of the rate generator 102. Thus, this signal may be expressed in the form $$\frac{w_0^2 s\theta_E}{s^2+2\xi w_0 s+w_0^2}$$

where $w_0$ and $\xi$ are the natural frequency and damping ratio of the follow-up servo. Switching of the outputs from the glide path signal $(\phi-\phi_0)$ to the function $(\theta_E-\theta_0)+K\theta_E$ is accomplished automatically by the latching relay 165 or a solid state switching circuit at the instant when $(\theta_E-\theta_0)+K\theta_E$ equals zero. The design value of K is chosen on the basis of where the flare must be initiated in order to meet the desired touchdown conditions.

Time-to-go touchdown of the aircraft after initiation of the second or flare phase may be computed from the expression $$\tau TD = \tau_1 - \tau$$

where $\tau TD$ is the time-to-go touchdown
$\tau$ is the elapsed time since the initiation of the flare
$\tau_1$ is the computed time-to-go at the initiation of the flare, and is computed by means of the equation below.

Thus, during the flare, $\tau$ can be computed on an essentially extrapolated basis from the conditions existing at flare initiation, or at some other selected point. The time which indicates the time elapsed since flare initiation can be started at the time when $$\phi - \theta_E = \theta_E \tau_1$$

This is done by activating a latching switch relay 165.

The output controlling signal supplies a displacement plus pseudo-integral function to modify the approach and flare track error signals.

It is desired to obtain proportional plus integral control of the command signal throughout the approach and flare period. A satisfactory approximation can be obtained by use of the lag $$\frac{w_0}{s + w_0}$$

up to a period of about one time constant. Since the desired period may be as long as 50–100 seconds, the practical problem is how to obtain such a time constant reliably. The employment of negative feedback around a lag network results in a shortening of the time constant, however, when employed around a lead network the effect of the negative feedback is to lengthen the time constant. Thus a long time constant lead circuit is feasible. Although the feedback herein provided is around the D.C. lead network 30, the feedback is A.C., thus eliminating most of the drift problems associated with D.C. feedback amplifiers.

By means of the above-mentioned long time constant lead circuit, it is possible to obtain a function of the form $$\frac{s}{s + w_0}$$

with time constants as long as 150 seconds. By passing the signal through lead network 30 and then subtracting it from the attenuated original signal, it is possible to obtain the function $$1 + \frac{b_{w_0}}{s + w_0}$$

The modulator 20 at the input to a track error control channel is used as a device which multiplies the displacement signal with the absolute value of beam rate.

The primary function of the $\theta_E$ follow-up system is to generate a function $$\frac{s\theta_E}{s^2 + 2\xi w_0 s + w_0^2}$$

which can be used as a close approximation for $\theta_E$ throughout the desired frequency range. The follow-up transducer is a linear resolver synchro 116. The output voltage of this element is demodulated by the demodulator 202 and compared with the D.C. input signal of $\theta_E$. The error voltage is modulated by the modulator 86 and amplified in a 400 c.p.s. servo amplifier 90 to drive a two-phase servomotor 96 which positions the output shaft 113. Rigidly coupled to the motor is the precision rate-generator 102. The desired amount of this rate voltage, after demodulation, is fed into the flight control signal chain during flare, together with the original $\theta_E$ input signal. Thus no lag at all is added with the original $\theta_E$ signal, and the $\theta_E$ is without any significant lag providing that the natural frequency of the follow-up system is sufficiently high. In order to obtain a smoother rate signal at low rates, it is also necessary that the gear reduction 112 be as large as is compatible with the maximum rate of change of $\theta_E$ which will be encountered. Since the output rate damping used in the servo system is solely for the purpose of stability, the amount of rate voltage fed into the servo-amplifier 90 can be limited by a suitable diode means 121 so as to prevent a decrease of slewing speed of the servomotor 96 under high signal operating conditions.

Since the $\theta_E$ signal obtainable from the A.C. winding of the linear follow-up synchro 116 will differ from the actual input signal of $\theta_E$ by a slight velocity lag, it is possible to correct for this error by adding a proper amount of rate signal from the generator 102 to the output of the linear synchro 116 applied through the gain circuit 212 to the Schmitt trigger latching circuit 216.

A time-to-go signal is needed as a gain control function of the display deviation signals applied to the display device 72. As described and claimed in the aforenoted U.S. application Serial No. 248,329, filed December 31, 1962, by Frederick B. Sylvander the gain control function may be effected by the potentiometer arm 242 driven by the constant speed motor 234. The motor 234 is started when the predetermined time to go is reached and starts moving from an initial position corresponding to $t_0$ as set by the adjustment of the manual control 252. This position is preset by the same adjustment which sets $t_0$ into the computation, and is essentially a fixed design parameter made adjustable for the purpose of experimentation.

The glide path beam angle $\phi_0$ is also preset for use in the computation of $\tau$. It is apparent that, since $\theta_E$ is nearly equal to $\phi_0$ during the early phase of approach, that $\phi_0$ could be measured automatically and retained.

Two relays are shown on the schematic of FIGURE 2, one for initiation of flare and one for starting the time-to-go extrapolation.

Attention is directed to the following features of the approach and flare out computer described above:

(1) There has been provided means for flying both the approach and flare to touchdown using two elevation angle data transmissions A and B of FIGURE 1. Transients are minimized at the switchover to flare by logically selecting that operation to occur when a null is generated in the flare computation.

(2) The absolute magnitude of rate of change of glide path and flare path deviation is used to minimize the effects of beam noise and to aid in automatically desensitizing both the approach and flare automatic modes of operation.

While a single embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A control system of a flight vehicle under control of two land based elevation angle data transmission devices; said control system comprising a first device for receiving glide path signals from one of said data transmission devices, a second device for receiving flare path signals from the other of said data transmission devices, relay means operable by the flare path signal receiving device for transferring control of the system from the glide path signal receiving device to the flare path signal receiving device, a differentiating circuit means for effecting an output signal in response to rate of change in the output signal provided by the flare path signal receiving device, and means for applying said rate signal to the output signal from the flare path signal receiving device for rendering the relay means effective upon the rate of change in the signal provided by the flare path signal receiving device being at a predetermined value relative to the output signal provided by the flare path signal receiving device.

2. The combination defined by claim 1 including servomotor means operable by an output signal from the flare path signal receiving device, a rate generator driven by the servomotor means for effecting a rate signal in response to a rate of change in the output signal provided by the flare path signal receiving device, and means for applying said rate signal to the output signal from the flare path signal receiving device for rendering the relay means effective upon the rate of change in the signal provided by the flare path signal receiving device arriving at a predetermined value relative to the output signal provided by the flare path signal receiving device.

3. A control system of a flight vehicle, said control system being responsive to signals from a pair of land based signal transmitters; said control system comprising first and second means for receiving signals from said transmitters, control means for selectively connecting said first and second signal receiving means in controlling relation in said system, means responsive to an output signal from the second signal receiving means for effecting a rate signal varying with the rate of change in the output signal provided by said second signal receiving means, and means for applying said rate signal to the output signal from the second signal reciving means so as to render said control means effective for selectively transferring the control of said system from said first signal receiving means to said second signal receiving means upon the rate of change in the signal provided by the second signal receiving means being at a predetermined value relative to the output signal provided by the second signal receiving means.

4. A flight vehicle control system for controlling the flight path of the vehicle from signals provided by a pair of land based signal transmitting devices, one of said devices transmitting a glide path signal and another of said devices transmitting a flare path signal, said control system comprising a glide path signal receiving device for effecting an output signal corresponding to said glide path signal, a flare path signal receiving device for effecting an output signal corresponding to said flare path signal device, relay means for selectively connecting the glide path output signal and the flare path output signal in controlling relation in said system, said relay means being operable to initially connect said glide path output signal in controlling relation in said system, means responsive to rate of change in the flare path output signal for effecting a rate signal, means for providing a third signal acting as the algebraic sum of said rate signal and the flare path output signal to effect a resultant signal, said relay means being operable in response to said resultant signal for disconnecting the glide path output signal from said controlling relation and operably connecting said flare path output signal into said controlling relation upon the resultant signal having a predetermined value so as to cause control of the aircraft to transfer from the glide path to the flare path.

5. A control system for a flight director situation display carried by an aircraft; said control system comprising a first device for receiving glide path signals from a land based data transmission device, a second device for receiving flare path signals from another land based data transmission device, relay means for transferring control of the system from the glide path signal receiving device to the flare path signal receiving device, means operable by an output signal from the flare path signal receiving device for effecting an output signal in response to a rate of change in the output signal provided by the flare path signal receiving device, means for applying a reference signal which is summed algebraically with said rate signal and the output signal from the flare path signal receiving device for effecting a resulting signal, and means for applying the resultant signal to the relay means so as to render the relay means effective to transfer control of the system from the glide path receiving device to the flare path signal receiving device upon the resultant signal being of a predetermined value.

6. The combination defined by claim 5 including servomotor means operable by an output signal from the flare path signal receiving device, a rate generator driven by the servomotor means for effecting an output signal in response to a rate of change in the output signal provided by the flare path signal receiving device, means for applying a reference signal which is summed algebraically with said rate signal and the output signal from the flare path signal receiving device for effecting a resultant signal, and means for applying the resultant signal to the relay means so as to render the relay means effective to transfer control of the system from the glide path signal receiving device to the flare path signal receiving device upon the resultant signal being of a predetermined value.

7. A control system for a flight director situation display carried by an aircraft; said control system comprising first and second means for receiving signals from land based signal transmitters, control means for selectively connecting said first and second signal receiving means in controlling relation in said system, means for effecting an output signal in response to rate of change in an output signal from the second signal receiving means, means for applying a reference signal which is summed algebraically with said rate signal and the output signal from the second signal receiving means for effecting a resultant signal, and means for applying the resultant signal to the control means so as to render the control means effective to transfer control of the system from the first signal receiving means to the second signal receiving means upon the resultant signal being of a predetermined value.

8. A system for controlling an aircraft borne flight director situation display from signals provided by a pair of land based signal transmitting devices, one of said devices transmitting a glide path signal and another of said devices transmitting a flare path signal; said control system comprising a first device for receiving the glide path signal, a second device for receiving the flare path signal, relay means for selectively connecting the glide path signal receiving device and flare path signal receiving device in controlling relation in said system, said relay means being operable in one sense to initially connect said glide path signal receiving device in controlling relation in said system, said relay means being operable in another sense for disconnecting the glide path signal receiving device from said controlling relation and operably connecting said flare path signal receiving device into said controlling relation, means for effecting a rate signal in response to a rate of change in the output signal from the flare path signal receiving device, and means for applying said rate signal to the output signal from the flare path signal receiving device for rendering the relay means effective upon the rate of change in the signal provided by the flare path signal receiving device being at a predetermined value relative to the output signal provided by the flare path signal receiving device.

References Cited by the Examiner

UNITED STATES PATENTS 3,189,904   6/1965   Tatz _____ 343—108

References Cited by the Applicant

UNITED STATES PATENTS 2,272,997   2/1942   Alford.
2,682,051   6/1956   Fisher.
2,830,291   4/1958   Hecht et al.
2,841,345   7/1958   Halpert et al.
2,871,469   1/1959   Franke.
2,939,652   6/1960   Hobley.
2,952,845   9/1960   Begovich et al.
2,969,943   1/1961   Schwartz.
2,987,275   6/1961   Moncrieff-Yeates et al.

CHESTER L. JUSTUS, *Primary Examiner.*

H. C. WAMSLEY, *Assistant Examiner.*